July 19, 1960 — G. A. LYON — 2,945,565
WHEEL STRUCTURE
Filed May 5, 1955
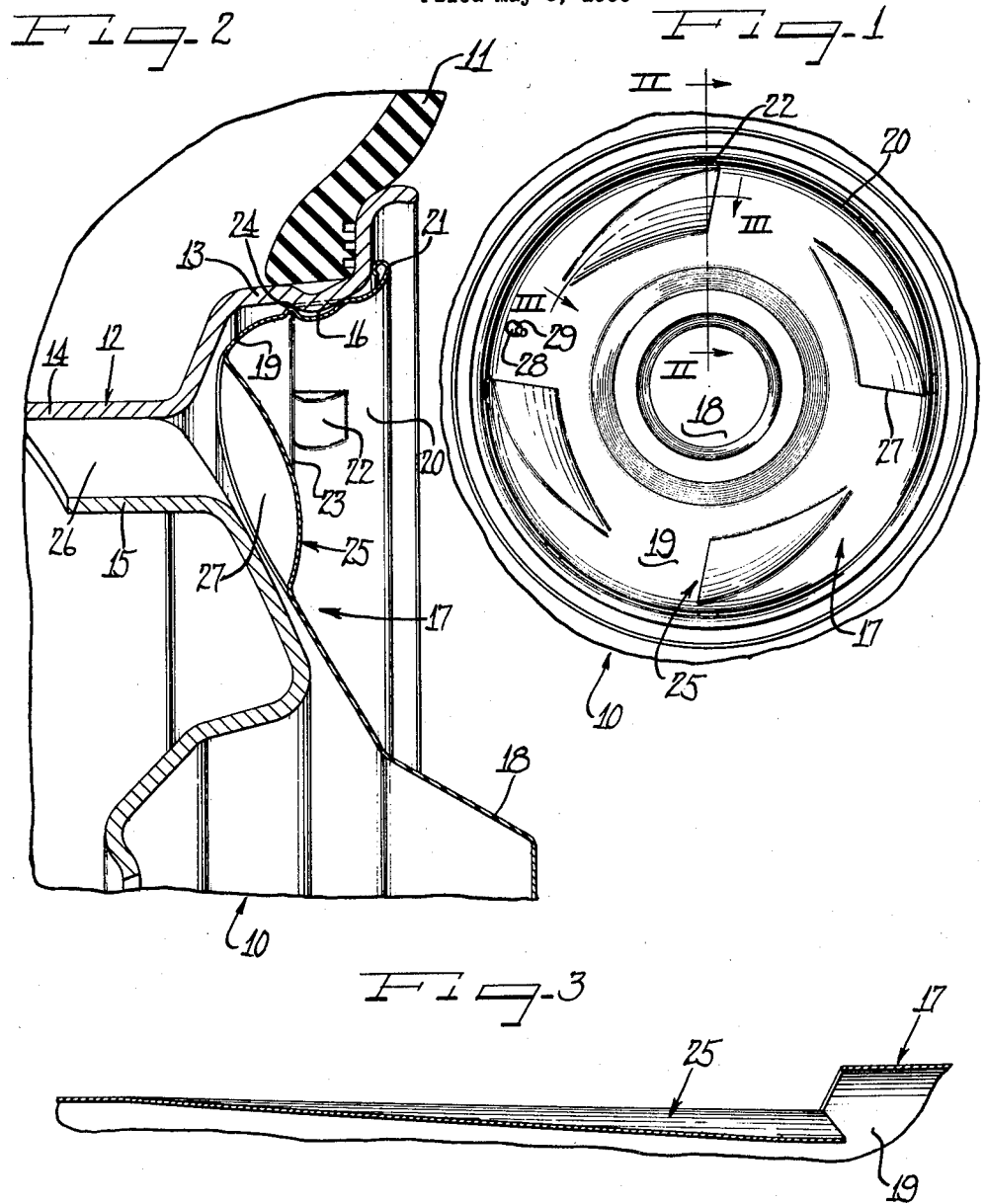
Inventor
George Albert Lyon

United States Patent Office 2,945,565
Patented July 19, 1960

2,945,565

WHEEL STRUCTURE

George Albert Lyon, 13881 W. Chicago Blvd., Detroit, Mich.

Filed May 5, 1955, Ser. No. 506,243

1 Claim. (Cl. 188—264)

This invention relates to a wheel cover and more particularly to a wheel cover having novel air scoops provided thereon.

In the automobile industry at the present time there is now on the drawing boards higher speed type automobiles which will require a revision in the wheel cover specifications due to the improved braking facilities which will be required for the higher speed type automobiles. One of the principal problems which will have to be solved is the provision of cooling means for the automobile brake drum which will be moving at higher and higher rates of speed thereby developing higher heat temperatures in the brakage of the automobile than heretofore encountered.

Accordingly, it is an object of this invention to provide a new and improved wheel cover having air cooling means of sufficient capacity to cool the brake drums of the automobiles of the future.

Still another object of this invention is in the provision of novel retaining means which develops gripping capacities capable of maintaining the cover on the wheel assembly of the planned faster moving automobiles of the future.

A still further object of this invention is to provide a highly simple, unitary sheet metal cover, having air cooling and retaining means thereon which lends itself to economical manufacture on a large production basis.

In accordance with the general features of the invention there is provided in a cover structure for a wheel including tire rim and body parts having an opening at the juncture of the parts and with one of the parts having generally radially extending protuberances disposed generally in a common circle about the axis of the wheel, a metallic circular cover member having an outer marginal annular edge portion merging into a dished curved inner portion with an annular shoulder at the junction of the portions, the outer portion having axially outwardly offset recesses adapted to register with the wheel protuberance, and each recess being defined on one of its sides by the shoulder, the shoulder being common to all the recesses and being resiliently deflectable radially when pressed against the wheel protuberances for entry of the protuberances in the recesses to retain the cover on the wheel and against turning, and a plurality of circumferentially spaced horn-shaped air scoops being out of concentricity with the cover so as to be capable of developing improved air flow characteristics through the wheel opening.

Other objects and features of the invention will more fully appear from the following detailed description taken in connection with the accompanying drawing which illustrates a single embodiment thereof, and in which:

Figure 1 is a fragmentary side view of a wheel structure having a cover embodying features of this invention;

Figure 2 is an enlarged fragmentary cross sectional view taken on the line II—II of Figure 1 looking in the direction indicated by the arrows; and Figure 3 is an enlarged fragmentary sectional view taken on the line III—III of Figure 1 showing in more detail my novel air scoops.

As shown on the drawings:

The reference character 10 designates generally a wheel including a tire 11 cooperable with a drop center flanged type of tire rim 12. The tire rim 12 includes a plurality of stepped flanges, one of which, namely flange 13, is inclined axially and merges into the usual terminal flange 14 which is suitably connected to the spider or body part 15. The metal body part or spider 15 is adapted to be provided with a central bolt-on flange (not shown) for detachable cooperation, in the usual manner, with the vehicle axis.

The axial flange 13 has a plurality of circumferentially spaced protuberances or bumps 16 which extend in a radial direction inwardly of flange 13. Secured to the wheel 10 is a sheet metal cover designated generally by the reference numeral 17 embodying features of this invention. This cover may be economically manufactured on a large production basis as a stamping punched from sheet metal such as stainless steel strip.

The cover 17 includes an ornamental crown or central portion 18, an axially inwardly dished annular portion 19 of generally curved configuration and a generally axially extending outer terminal portion 20 having a rolled or beaded edge 21. The beaded edge 21 is adapted to bottom against the rim flange 12 when the cover 17 is assembled on the wheel 10. If desired, however, the dished portion 19 may bottom against the rim 12 and the body part 15.

The annular dished portion 19 blends smoothly into the terminal cover portion 20 which is positioned in generally normal relation to the dished portion 19.

Adapted to overlie the retaining bumps 16 generally at the junction of the cover portions 19 and 20 are a plurality of generally radially inwardly extending indentations or sockets 22. These indentations or sockets which are embossed on the cover may be of a greater number than the bumps, that is, comprising 3 to 6 as desired.

Axially inwardly of the annular indentations or sockets which are generally in the same radial plane is a continuous annular resilient rib or shoulder 23 terminating in a gripping extremity or edge 24. The edge 24 of the rib 23 is normally in a circle of a diameter slightly greater than the diameter of a circle common to the innermost surfaces of the protuberances 16.

By virtue of employing a resilient rib 23 of greater diameter than the innermost surfaces of the bumps 16 which is made possible by reason of the material characteristics of the metal retaining means for the cover 17, is accordingly provided.

Now it will be appreciated that as a result of employing a plurality of generally horn-shaped or arcuately tapered circumferentially spaced air louvers or scoops 25, the outer margin of the cover will be rendered more resilient.

The generally horn-shaped air louvers are stamped out of the axially inwardly dished annular portion 19 so that they will be positioned in general axial alignment with the generally axally inwardly opening wheel openings 26.

The wheel openings 26 are of such configuration so as to permit air to be drawn from or directed upon the brake drum area (not shown) depending upon which direction the scoops 25 are pointed. In the preferred illustrated embodiment, each of the scoops 25 has an open end or orifice 27 disposed axiallly outwardly of the dished portion 19 which acts as either an inlet or outlet, depending on the desired end result. It will of course be appreciated that right handed and left handed covers may be switched to achieve the desired result.

By virtue of the fact that the shoulder means afforded by the cover-retaining rib 23, and as delineated by the bump receiving sockets 22 are in generally radial alignment with the enlarged orifices 27 as best visualized in Figure 1, and with only a narrow portion of the radially outwardly facing annular portion of the dished portion 19 of the cover intervening between the orifices and the shoulder means in each instance, the resilient deflectability of the shoulder means is substantially enhanced as compared to those portions of the dished portion of the cover between the air scoops 25.

As is best seen in Figure 2, the curvature of each of the scoops 25 is out of concentricity with the axis of the cover and is more or less tangential to the cover. This feature permits of a better overall action by the scoops 25 in accomplishing its air moving function to cool the brake drums. In other words, a greater air turbulence may be effected by utilizing tangential circumferentially spaced air scoops.

The reduction of areas between the air inlet or opening 27 as is best seen in Figure 2 and the reduced effective discharge area adjacent the other end of the scoops creates increased cooling velocities not present in the conventional wheel cover air scoops.

Additionally, due to the relatively few number of scoops employed, namely four, the overall size of the scoop and the space between the scoops may be increased thereby contributing to the creation of increased air cooling velocities at lower wheel speeds not present in conventional scoop constructions. The reason for this is that there is less interference between ducts in blocking air flow as each duct is moved out of the effective air stream as the next duct reaches the point of maximum air stream velocity through the duct.

It will be noted that the enlarged inlet end of the scoop is in an axially outwardly offset position with the remainder of the scoop being progressively arcuately tapered to the other extremity of the same. It will now be appreciated that the enlarged axially outwardly offset configuration of the scoop in combination with eccentric curvature of the scoop, imparts a centripetal flow action to the air being scooped. This air is forced into the scoop opening or orifice 27 and compressed as it is carried through the eccentric scoop and is directed radially and axially through the wheel opening 26 onto the wheel bearing area (not shown). As the wheel axle is rotated it is of course well known that air tends to travel outwardly because of the centrifugal action set up by the rotation of the moving elements.

In view of the foregoing it will be now appreciated that as a result of the centripetal direction in which the air is directed by the scoop, the coolest air finds its way into the wheel bearing area which is one of the most critical areas to over-heating. By reason of the instant construction both the wheel bearing area and the brake drum areas are more efficiently cooled.

The present wheel construction is therefore capable of reducing break-down of the bearing, wear, excessive reduction of viscosity of the wheel bearing grease, scoring and misalignment of the wheels, due to excessive heat.

In the application of the cover 17 to the wheel, the valve stem 28 is inserted through the hole 29 provided in the cover. The circumferential spacing of the sockets 22 is such that there is at least one socket which is axially alignable for each of the corresponding bumps 16.

The cover is then urged axially inwardly with the result that the edge 24 is deflected over the annular bump 16 into bottomed engagement therebehind with the bump being encased by the socket 22. When the bumps are disposed in the indentations, they are not only resiliently gripped by the cover for detachably retaining the cover on the wheel but also for preventing relative co-rotation of the cover and the wheel.

The indentations 22 (Figure 1 are arranged in a common circle and serve to ornament the cover in addition to their above mentioned function. If desired, the embossed indentations can be painted in color so as to stand out in contrast to the luster of the cover when finished.

It will be understood that modifications and variations may be effected without departing from the scope of the novel concepts of the present invention.

I claim as my invention:

In a wheel structure, a wheel including tire rim and body parts having circumferentially spaced wheel openings generally at the juncture of the parts, the tire rim having a generally radially inwardly facing flange provided with inwardly projecting rigid cover-retaining protrusions, a circular cover member for overlying protective disposition upon the wheel and having a body provided with an axially inwardly dished annular portion to lie adjacent to said openings and defined at its radially outer side by a generally radially outwardly facing annular portion having resiliently deflectable shoulder means engageable in press-on, pry-off relation with said protrusions for maintaining same on the wheel, said cover member having formed in said dished portion in close proximity to the wheel openings enlarged, circumferentially spaced, axially outwardly extending, arcuately tapered air scoops with said scoops each having an enlarged circumferentially opening orifice axially offset from the cover member to facilitate air flow therethrough, said scoops being shaped so as to progressively compress the air in the forward movement of the wheel assembly while directing the air in a centripetal direction through the wheel openings, said enlarged scoops being limited in number and positioned circumferentially to substantially eliminate interference between said scoops in blocking air flow by moving each spaced scoop out of the effective air stream so that the succeeding scoop is not subject to turbulent air flow interference from the preceding scoop as the cover rotates, the shoulder means being in generally radial alignment with the enlarged orifices and with only a narrow portion of said radially outwardly facing annular portion intervening therebetween in each instance to enhance the resilient deflectability of the shoulder means.

References Cited in the file of this patent

UNITED STATES PATENTS

| | | |
|---|---|---|
| 1,665,437 | Booth | Apr. 10, 1928 |
| 2,130,207 | Van Halteren | Sept. 13, 1938 |
| 2,326,788 | Lyon | Aug. 17, 1943 |
| 2,631,066 | Horn | Mar. 10, 1953 |
| 2,669,487 | Horn | Feb. 1, 1954 |
| 2,682,937 | Lyon | July 6, 1954 |
| 2,865,680 | Lyon | Dec. 23, 1958 |

FOREIGN PATENTS

| | | |
|---|---|---|
| 830,302 | Germany | Feb. 4, 1952 |
| 486,177 | Great Britain | May 31, 1938 |
| 744,837 | Great Britain | Feb. 15, 1956 |